(12) United States Patent
Lemke et al.

(10) Patent No.: US 12,575,004 B2
(45) **Date of Patent: *Mar. 10, 2026**

(54) CONTROL SYSTEM FOR CONTROLLING A HEATER

(71) Applicant: WATLOW ELECTRIC MANUFACTURING COMPANY, St. Louis, MO (US)

(72) Inventors: John Lemke, Houston, MN (US); Martin Currie, Winona, MN (US); William Bohlinger, Winona, MN (US); Stanton H. Breitlow, Winona, MN (US); Adam Kidney, Winona, MN (US); Kurt Peterson, LaCrosse, WI (US); James Hentges, Winona, MN (US)

(73) Assignee: WATLOW ELECTRIC MANUFACTURING COMPANY, St. Louis, MO (US)

( * ) Notice: Subject to any disclaimer, the term of this patent is extended or adjusted under 35 U.S.C. 154(b) by 574 days.

This patent is subject to a terminal disclaimer.

(21) Appl. No.: 18/094,072

(22) Filed: Jan. 6, 2023

(65) Prior Publication Data

US 2023/0164885 A1 May 25, 2023

Related U.S. Application Data

(63) Continuation of application No. 16/294,201, filed on Mar. 6, 2019, now Pat. No. 11,558,933.

(Continued)

(51) Int. Cl.
| | |
|---|---|
| *H05B 1/02* | (2006.01) |
| *G05D 23/19* | (2006.01) |
| *H05B 3/42* | (2006.01) |

(52) U.S. Cl.
CPC ....... *H05B 1/0288* (2013.01); *G05D 23/1934* (2013.01); *H05B 1/0291* (2013.01); *H05B 3/42* (2013.01)

(58) Field of Classification Search
None
See application file for complete search history.

(56) References Cited

U.S. PATENT DOCUMENTS

| | | | | |
|---|---|---|---|---|
| 5,001,327 A | * | 3/1991 | Hirasawa | H01L 21/67109 219/390 |
| 5,900,177 A | * | 5/1999 | Lecouras | C30B 31/12 219/486 |

(Continued)

FOREIGN PATENT DOCUMENTS

| | | |
|---|---|---|
| JP | S58019916 A | 2/1983 |
| JP | S62176297 A | 8/1987 |

(Continued)

OTHER PUBLICATIONS

Office Action issued in corresponding KR Application 10-2020-7027892, issued Jan. 8, 2024, and English Translation, 11 pages.

(Continued)

*Primary Examiner* — John J Norton

(74) *Attorney, Agent, or Firm* — Burris Law, PLLC

(57) ABSTRACT

The present disclosure is directed toward a control system and method for controlling a heater system. The control system includes a plurality of zone control circuits, a primary controller, a plurality of power controllers, and a plurality of sensor controllers. The zone control circuits are operable to provide power to a plurality of heater zones of the heater system and to measure performance characteristics of the zones. The power controllers are coupled to the plurality of zone control circuits to control power to the plurality of zones. The sensor controllers monitor operation of the heater zones based on the performance characteristics. The primary controller is coupled to the power controllers and is configured to provide an operation set-point for each of the heater zones based on the performance characteristics.

20 Claims, 4 Drawing Sheets

Related U.S. Application Data

(60) Provisional application No. 62/640,143, filed on Mar. 8, 2018.

(56) References Cited

U.S. PATENT DOCUMENTS

| | | | |
|---|---|---|---|
| 6,242,720 B1 | 6/2001 | Wilson et al. | |
| 2005/0109767 A1* | 5/2005 | Fennewald | ......... B29C 45/2737 |
| | | | 219/543 |

FOREIGN PATENT DOCUMENTS

| | | | |
|---|---|---|---|
| JP | S6391987 | A | 4/1988 |
| JP | H11015537 | A | 1/1999 |
| JP | 2003228254 | A | 8/2003 |
| WO | 2017218791 | A1 | 12/2017 |

OTHER PUBLICATIONS

Office Action issued in corresponding JP Application No. 2020-546903, issued Feb. 21, 2023 and an English Translation 10 pages.
Decision to Grant issued in corresponding JP Application No. 2020-546903, issued May 28, 2024 and English translation, 5 pages.
Search Report issued in corresponding TW Application No. 110139539, completed Jan. 9, 2023, 1 page.

* cited by examiner

CONTROL SYSTEM FOR CONTROLLING A HEATER

CROSS-REFERENCE TO RELATED APPLICATIONS

The application is a continuation of U.S. application Ser. No. 16/294,201 filed Mar. 6, 2019, now U.S. Pat. No. 11,558,933, which claims the benefit of and priority to U.S. Provisional Application No. 62/640,143 filed on Mar. 8, 2018. The content of the above applications is incorporated herein by reference in their entirety.

FIELD

The present disclosure relates to a system and/or method for controlling a thermal system having a heater with power-sense control.

BACKGROUND

The statements in this section merely provide background information related to the present disclosure and may not constitute prior art.

Resistive heaters are used in a variety of applications to provide heat to a target and/or environment. For example, such resistive heaters include, but are not limited to: cartridge heaters, fluid line heater, or other suitable heaters. A control system typically controls the power to the resistive heater to regulate the amount of heat being generated by the heater.

In some applications, the control system is a closed loop system that receives feedback data from discrete sensors that monitor the performance of the resistive heaters. While the discrete sensors provide data to fine tune control of the resistive heaters, the sensors can take up space and add complexity to the overall thermal system. These and other issues are addressed by the present disclosure.

SUMMARY

This section provides a general summary of the disclosure and is not a comprehensive disclosure of its full scope or all of its features.

In one form, the present disclosure is directed toward a control system for controlling a heater system having a plurality of resistive heating elements that define a plurality of heater zones. The control system includes a plurality of zone control circuits, a primary controller, a plurality of power controllers, and a plurality of sensor controllers. The plurality of zone control circuits are configured to provide power to the plurality of resistive heating elements and measure electrical characteristics of the plurality of resistive heating elements. The primary controller is configured to provide an operation set-point for each of the plurality of heater zones based on the electrical characteristics. The plurality of power controllers are configured to control the power provided to the plurality of heater zones based on the operation set-point. The plurality of sensor controllers are configured to monitor operation of the heater zones based on the electrical characteristics, where each of the plurality of sensor controllers is coupled to the primary controller and each of the plurality of zone control circuits.

The following includes variations of the control system of the above paragraph, which may be implemented individually or in any combination.

In some variations, each power controller from among the plurality of power controllers is coupled to the primary controller and a set of zone control circuits from among the plurality of zone control circuits.

In some variations, the plurality of sensor controllers are configured to perform one or more diagnostics based on the electrical characteristics, and the one or more diagnostics include a heater zone diagnostic, a zone-to-zone diagnostic, a diagnostic verification check, or a combination thereof.

In some variations, the plurality of sensor controllers are configured to calculate a performance characteristic based on the electrical characteristics, and the one or more diagnostics are further based on the performance characteristic.

In some variations, the plurality of sensor controllers are configured to perform a protective measure based on the one or more diagnostics. The protective measure includes at least one of: providing a notification to the primary controller; or selectively coupling a power supply to the primary controller, the plurality of zone control circuits, the plurality of power controllers, the plurality of sensor controllers, or a combination thereof.

In some variations, the plurality of sensor controllers are configured to perform a heater zone diagnostic. The heater zone diagnostic includes: determining whether a set of resistive heating elements from among the plurality of resistive heating elements are operating in accordance with the operation set-point; and performing a protective measure in response to the set of resistive heating elements not operating in accordance with the operation set-point.

In some variations, the plurality of sensor controllers are configured to perform a zone-to-zone diagnostic. The zone-to-zone diagnostic includes: determining a temperature difference between a pair of adjacent heater zones from among the plurality of heater zones; and performing a protective measure in response to the temperature difference exceeding a temperature variance threshold.

In some variations, the plurality of sensor controllers are configured to perform a diagnostic verification check. The diagnostic verification check includes authenticating the electrical characteristics measured by each of the plurality of sensor controllers.

In some variations, the operation set-point includes a temperature set-point, a power set-point, or a combination thereof.

In some variations, the primary controller is configured to perform a temperature limit control diagnostic. The temperature limit control diagnostic includes: determining whether a temperature of a set of resistive heating elements from among the plurality of resistive heating elements exceeds a predefined temperature limit; and performing a protective measure in response to the temperature exceeding the predefined temperature limit.

In some variations, the primary controller is configured to perform an auxiliary control check diagnostic. The auxiliary control check diagnostic includes: determining a primary performance characteristic based on the electrical characteristics; obtaining a plurality of performance characteristics determined by the plurality of sensor controllers; and selectively performing a protective measure based on a comparison between the primary performance characteristic and the plurality of performance characteristics.

In one form, the present disclosure is directed to a method for controlling a heater system having a plurality of resistive heating elements that define a plurality of heater zones. The method includes providing, by a plurality of zone control circuits, power to the plurality of resistive heating elements, measuring, by the plurality of zone control circuits, electrical characteristics of the plurality of resistive heating elements, providing, by a primary controller, an operation set-point for each of the plurality of heater zones based on the electrical characteristics, controlling, by a plurality of power controllers, the power provided to the plurality of heater zones based on the operation set-point, and monitoring, by a plurality of sensor controllers, operation of the heater zones based on the electrical characteristics, where each of the plurality of sensor controllers is coupled to the primary controller and each of the plurality of zone control circuits.

The following includes variations of the method for controlling a heater system having a plurality of resistive heating elements that define a plurality of heater zones of the above paragraph, which may be implemented individually or in any combination.

In some variations, the method further includes performing, by the plurality of sensor controllers, one or more diagnostics based on the electrical characteristics, where the one or more diagnostics include a heater zone diagnostic, a zone-to-zone diagnostic, a diagnostic verification check, or a combination thereof.

In some variations, the method further includes calculating, by the plurality of sensor controllers, a performance characteristic based on the electrical characteristics, where the one or more diagnostics are further based on the performance characteristic.

In some variations, the heater zone diagnostic includes determining whether a set of resistive heating elements from among the plurality of resistive heating elements are operating in accordance with the operation set-point, and performing a protective measure in response to the set of resistive heating elements not operating in accordance with the operation set-point.

In some variations, the zone-to-zone diagnostic includes determining a temperature difference between a pair of adjacent heater zones from among the plurality of heater zones, and performing a protective measure in response to the temperature difference exceeding a temperature variance threshold.

In some variations, the diagnostic verification check includes authenticating the electrical characteristics measured by each of the plurality of sensor controllers.

In some variations, the method further includes performing, by the primary controller, a temperature limit control diagnostic. The temperature limit control diagnostic includes determining whether a temperature of a set of resistive heating elements from among the plurality of resistive heating elements exceeds a predefined temperature limit, and performing a protective measure in response to the temperature exceeding the predefined temperature limit.

In some variations, the method further includes performing, by the primary controller, an auxiliary control check diagnostic. The auxiliary control check diagnostic includes determining a primary performance characteristic based on the electrical characteristics, obtaining a plurality of performance characteristics determined by the plurality of sensor controllers, and selectively performing a protective measure based on a comparison between the primary performance characteristic and the plurality of performance characteristics.

In one form, the present disclosure is directed to a control system for controlling a heater system having a plurality of resistive heating elements that define a plurality of heater zones. The control system includes a plurality of zone control circuits, a primary controller, a plurality of power controllers, and a plurality of sensor controllers. The plurality of zone control circuits are configured to provide power to the plurality of resistive heating elements and measure electrical characteristics of the plurality of resistive heating elements. The primary controller configured to provide an operation set-point for each of the plurality of heater zones based on the electrical characteristics. The plurality of power controllers are configured to control the power provided to the plurality of heater zones based on the operation set-point. The plurality of sensor controllers are configured to monitor operation of the heater zones based on the electrical characteristics. Each of the plurality of sensor controllers is coupled to the primary controller and each of the plurality of zone control circuits. Furthermore, each power controller from among the plurality of power controllers is coupled to the primary controller and a set of zone control circuits from among the plurality of zone control circuits and the plurality of sensor controllers are configured to perform one or more diagnostics based on the electrical characteristics.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
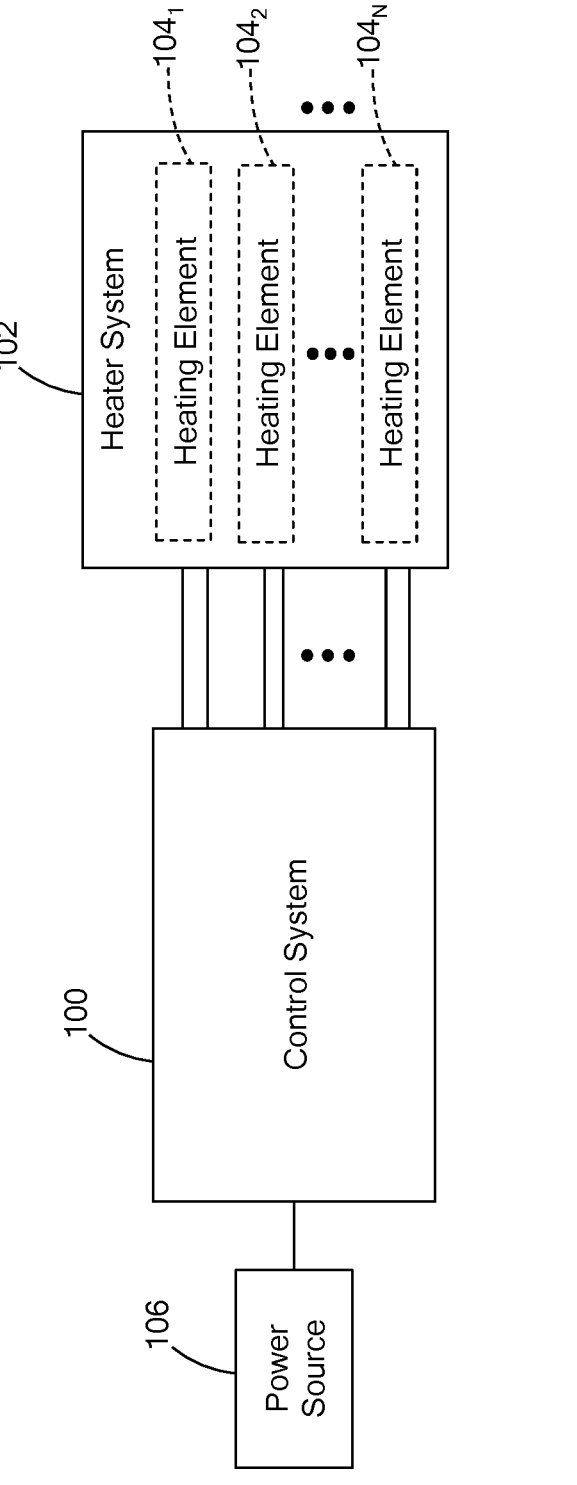
FIG. 1 is a block diagram of a thermal system having a control system in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A thermal system includes a heater system having multiple resistive heating elements and a control system that controls the operation of the heater system from supplying adjustable power to the resistive heating elements to performing system diagnostics. As part of a closed-loop control, discrete temperature sensors are disposed about the thermal system to measure various performance characteristics, such as temperature, voltage, current, resistance, etc. These discrete sensors can increase the size, cost, and complexity of the control system since each sensor would require a dedicated input/output interface (e.g., port, pin, etc.) to the control system.

The heater system may have power-sense capability to allow the control system to provide power and measure performance characteristics of the heater system without the use of a discrete sensor. This may reduce the number of discrete sensors, but discrete sensors are still used to verify the measurement taken from the heater system.

The present disclosure is directed toward a control system that has sensor diagnostic capability for verifying measurements of the heater system and performing a protective measure in the event an abnormal performance is detected. As described herein, the control system includes a primary controller for defining a power level for each resistive heating element, and at least two auxiliary controllers that provide power to the resistive heating elements and measure the performance characteristics of the heater system. Each auxiliary controller shares their data with the other auxiliary controller as part of a measurement verification or in other words, authentication check. In the event, a discrepancy between the measurements is dedicated, the auxiliary controller(s) notify the primary controller and/or perform a protective measure, such as discontinuing power to the heater system. In addition, each auxiliary controller performs one or more diagnostic to check the performance of the heater system. In the event of an abnormal performance, the auxiliary controllers may perform a protection measure to protect the thermal system.

Furthermore, the auxiliary controllers provide the performance characteristics to the primary controller, which further verifies the calculation and, performs one or more diagnostics to detect abnormal performance. Accordingly, the control system has at least two layers of protection to monitor the performance of the heater system, and the control system itself.

Referring to FIG. 1, the present disclosure is directed toward a control system 100 for a heater system 102 having one or more resistive heating elements 1041 to 104N (collectively "heating elements 104"; "N" is an integer) that define multiple heating zone. Together, the control system 100 and the heater system 102 form a thermal system.

The control system 100 is electrically coupled to the resistive heating elements 104 and provides adjustable power to the heating elements 104 by converting a voltage input from a power source 106 to a desired voltage output that may be equal to less than the voltage input.

The heater system 102 has power-sensing capability that allows the control system 102 to provide power and measure performance characteristics of the heater system. For example, in one form, the heater system 102 may be a "two-wire" heater such that changes in resistance of the heating elements 104 can be used by the control system 100 to determine performance characteristics, such as temperature. Such a two-wire system is disclosed in U.S. Pat. No. 7,196,295, which is commonly owned with the present application and the contents of which are incorporated herein by reference in their entirety. In a two-wire system, the system is an adaptive thermal system that merges heater designs with controls that incorporate power, resistance, voltage, and current in a customizable feedback control system that limits one or more these parameters (i.e., power, resistance, voltage, current) while controlling another. The control system is configured to monitor at least one of current, voltage, and power delivered to the heater system over a period time to acquire stable continuous current and voltage readings. These readings can then be used for determining resistance, and thus, temperature of the heating elements of the heater system.

Figure 2:
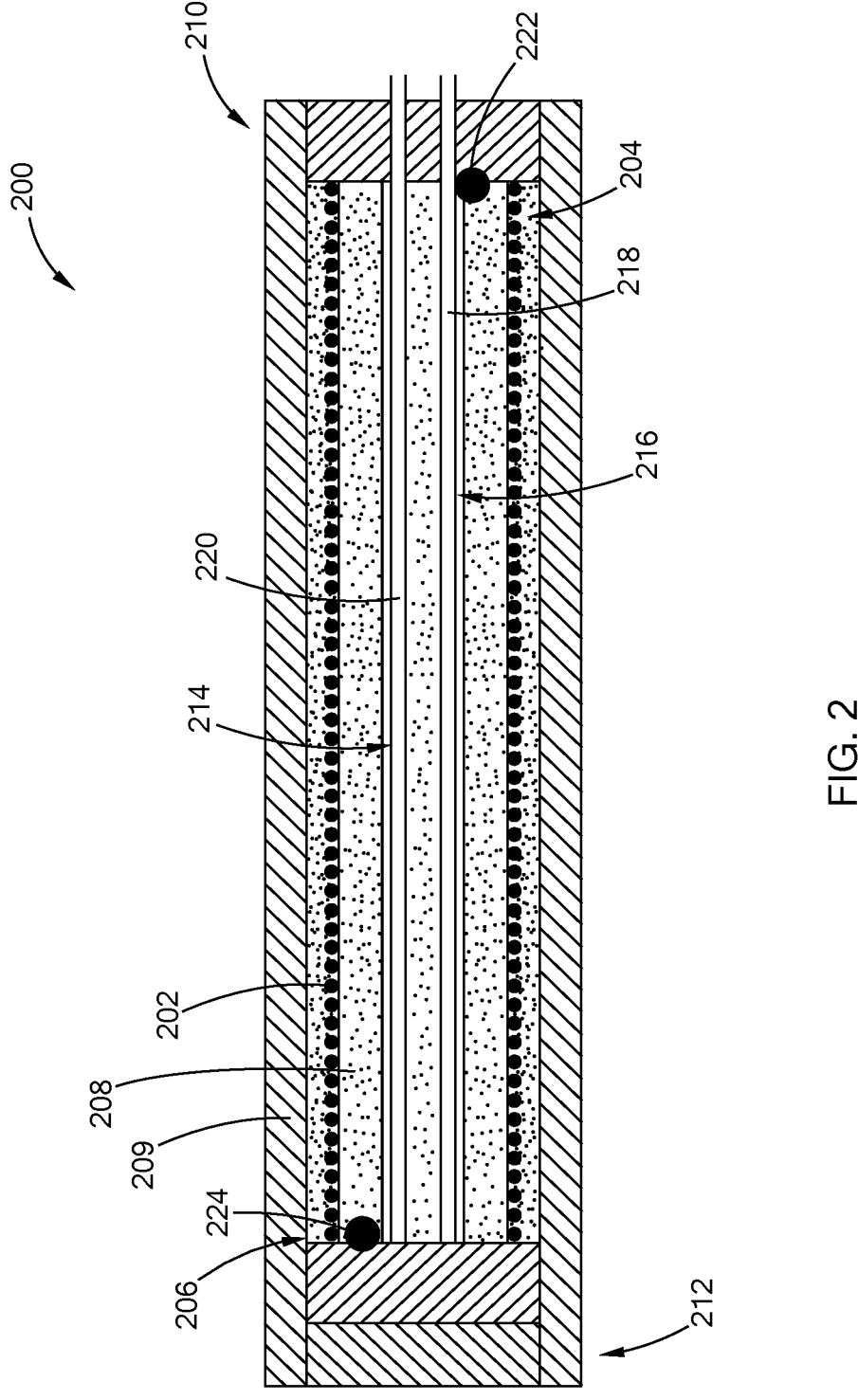
FIG. 2 is an example of a cartridge heater having temperature sensing power pins.

In another example, the heating element 104 of the heater system 102 may have temperature sensing power pins to connect to the control system 100. More particularly, referring to FIG. 2, the heater system 102 may include multiple cartridge heaters, such as a cartridge heater 200 that includes a resistive heating element 202 having two end portions 204 and 206. In one form, the resistive heating element 202 is in the form of a metal wire, such as a nichrome material by way of example, and is wound or disposed around a non-conductive portion (or core 208 that is surrounded by a sheath 209. The core 208 defines a proximal end 210 and a distal end 212 and further defines first and second apertures 214 and 216 extending through at least the proximal end 210.

The heater 200 further comprises a first power pin 218 that is made of a first conductive material and a second power pin 220 that is made of a second conductive material that is dissimilar from the first conductive material of the first power pin 218. Further, the resistive heating element 202 is made of a material that is different from the first and second conductive materials of the first and second power pins 218, 220 and forms a first junction 222 at end 204 with the first power pin 218 and a second junction 224 at its other end 206 with the second power pin 220. Because the resistive heating element 202 is a different material than the first power pin 218 at junction 222 and is a different material than the second power pin 220 at junction 224, a thermocouple junction is effectively formed. Accordingly, changes in voltage at the first and second junctions 222, 224 are detected to determine an average temperature of the heater 202 without the use of a separate/discrete temperature sensor.

Additional detail regarding the temperature sensing power pins is provided in Applicant's co-pending applications having U.S. Ser. No. 14/725,537, filed May 29, 2015 and titled "RESISTIVE HEATER WITH TEMPERATURE SENSING POWER PINS" and U.S. Ser. No. 15/950,358 filed Apr. 11, 2018 and titled "RESISTIVE HEATER WITH TEMPERATURE SENSING POWER PINS AND AUXILIARY SENSING JUNCTION." These applications are incorporated herein by reference in their entirety, and disclose a heater having one or more resistive heating elements that are connected to power pins that function as a thermocouple sensing pins to measure the temperature of the resistive heating element. According to the application, a controller is in communication with the power pins, and is configured to measure changes in voltage (mV) at the junctions formed by the heater resistive element and the power pins and to calculate an average temperature of the resistive heater element. The temperature sensing power pins may be used with other heaters, such a fluid line heater(s), a fluid immersion heater(s), or other suitable heaters, and should not be limited to cartridge heaters.

Figure 3:
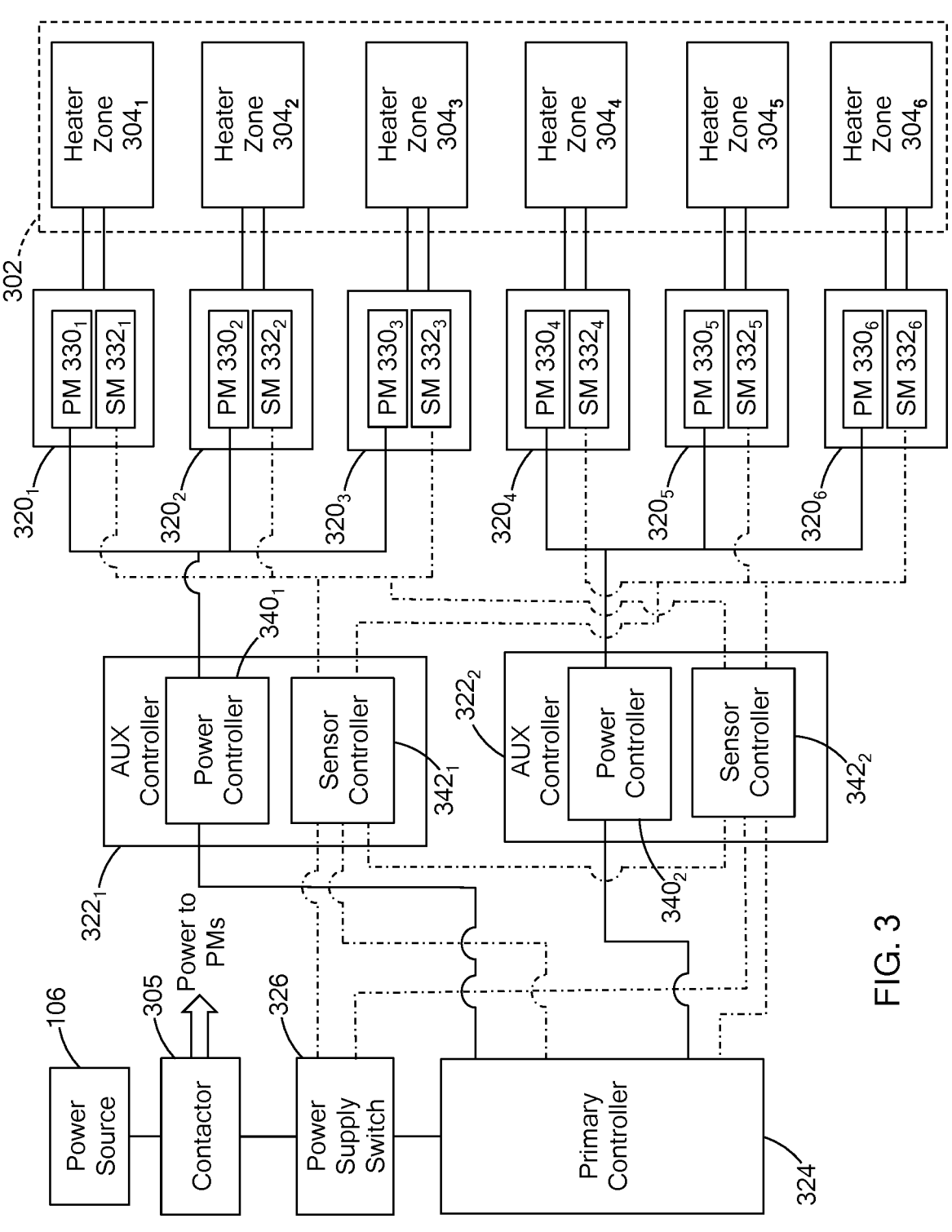
FIG. 3 is a block diagram of a control system for controlling a heater system having six heat zones.

Referring to FIG. 3, in one form, the control system 100 may be provided as a control system 300 that controls the operation of a heater system 302 having six heater zones 3041 to 3046 defined by multiple resistive heating elements (collectively "heater zones 304"). Like the heater system 102, the heater system 302 is has power-sensing capability and each heater zone 304 is electrically coupled to the control system 300. In one form, the control system 300 is coupled to the power source 106 via a contactor 305.

The control system 300 includes a plurality of zone control circuits 3201 to 3206 (collectively "zone control circuits 320"), at least two auxiliary (AUX) controllers 3221 and 3222 (collectively "auxiliary controllers 322"), a primary controller 324, and a power supply switch 326. It should be readily understood that the control system of the present disclosure can be configured to control any number of heater zones/heating elements (e.g., 2 or more), and thus, should not be limited to six.

In one form, the zone control circuits 320 are connected to the heater zones 304 to provide independent control of each zone 304. Each zone control circuit 320 includes a power module (PM) 330 (3301 to 3306 in figure) to control power to a particular zone 304 and a sensor module (SM) 332 (3321 to 3326 in figure) to measure electrical characteristics, such as voltage and/or current at the heating elements of the heater zone 304. Each sensor module 332 is coupled to both of the auxiliary controllers 322. The power modules 330 are provided in sets, such that each set of power modules 330 is coupled to an auxiliary controller 322 different from another set of power modules 330. For example, power modules 3301 to 3303 form one set that is coupled to auxiliary controller 3221, and power modules 3304 to 3306 form a second set that is coupled to auxiliary controller 3222.

Figure 4:
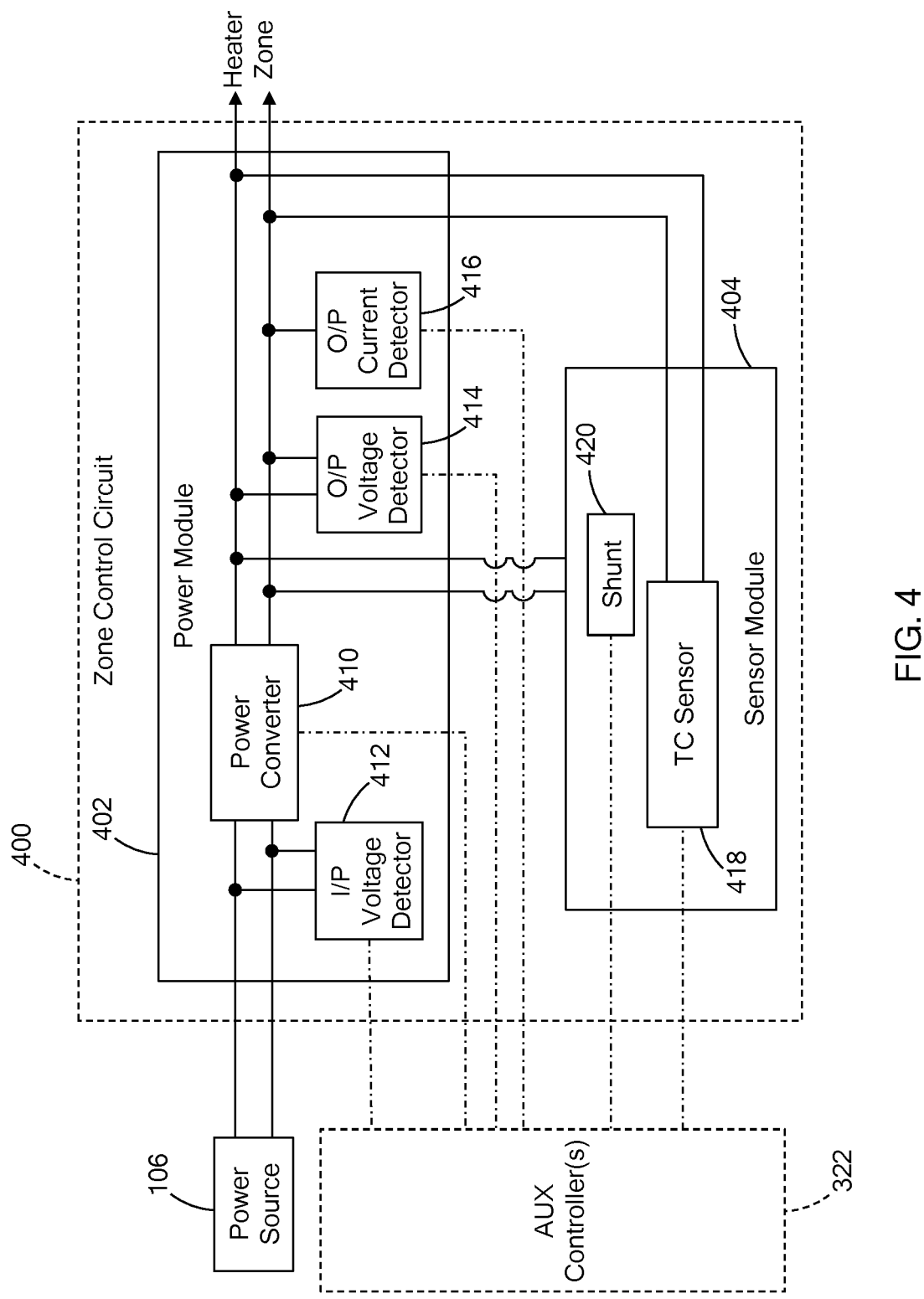
FIG. 4 is a block diagram of a zone control circuit of the control system.

In one form, the power modules 330 include a power converter, such as a buck converter, to provide adjustable power to the zone 304, and the sensor modules 332 include a voltage and/or current detector to measure the electrical characteristics. For example, referring to FIG. 4, an example zone control circuit 400 is configured to connect to a heater system having temperature sensing power pins that, as described above, utilizes a thermocouple junction for measuring temperature. In FIG. 4, the solid lines represent power and the dashed-dot-dashed lines represent data signals.

In one form, each zone control circuit 400 includes a power module 402 for providing adjustable power to a zone of the heater system and a sensor module 404 for measuring the electrical characteristics, such as change in voltage at the thermocouple junction. In one form, the power module 402 includes a power converter 410, such as a buck converter, that is operable by the auxiliary controller 322 to adjust an input voltage (VIN) from the power source 106 to an output voltage ($V_{OUT}$) that is applied to the heating elements of the heater zone. For example, the power converter 410 includes a control switch (not shown) and a driver circuit (not shown) coupled to the control switch. The driver circuit receives a power control signal from one of the auxiliary controllers 322 and actuates the control switch based on the power control signal to adjust the power from the power source 106. One example of such a power converter is further described in co-pending application U.S. Ser. No. 15/624,060, filed Jun. 15, 2017 and titled "POWER CONVERTER FOR A THERMAL SYSTEM", which is commonly owned with the present application and the contents of which are incorporated herein by reference in its entirety.

The power module 402 further includes an input (i/P) voltage detector 412 to detect the amount of voltage being supplied to the power converter 410 (i.e., input voltage), an output (O/P) voltage detector 414 to detect the amount of voltage being supplied to the heater system (i.e., voltage output), and an output (O/P) current detector 416 to detect the amount of current to the heater system (i.e., current output). The detectors 412, 414, and 416 may include a successive approximation register (SAR) for measuring the voltage and/or current. The input voltage, the output voltage, and the output current are communicated to the auxiliary controllers 322 for further processing.

In addition to other electronic components, in one form, the sensor module 404 includes a thermocouple (TC) sensor 418 that measures the change in voltage at the thermocouple junction at the time of a measurement operation, and a shunt 420 to divert leakage current during the measurement operation. In one form, the TC sensor 418 includes an analog-to-digital converter to convert the measured voltage, which is typically in mV, to a digital value, and a high voltage FET to block voltage spikes. The sensor module 404 may include additional electronic components to measure other electrical characteristics related to performance of the control system, such as a temperature at the connector to which the temperature sensing power pins are connected, and/or a temperature of the circuit board upon which the electronic components are disposed. The measurements taken by the sensor module 404 are provided to the auxiliary controllers 332 for further processing.

While the sensor module 404 is configured for measuring voltage at the thermocouple junction defined by the temperature sensing power pins, the sensor module 404 may be configured for a two-wire heater system in which the resistance of the heating elements is determined by measuring at least one of voltage and/or current of the heating element of the heater zone. In such configuration, the sensor module may include a power metering chip for measuring the voltage and/or current (e.g., electrical characteristics) at the heating element. This data is then used by the auxiliary controllers 332 to determine resistance and/or an average temperature of the heating element.

Referring back to FIG. 3, the auxiliary controllers 322 are configured to control power and monitor performance of the heater zones 304 based on the electrical characteristics from the zone control circuits 320. Each of the auxiliary controllers 332 include electronics, such as one or more microprocessors, memory (e.g., RAM, ROM, etc.) that stores computer readable instructions (i.e., software programs) executed by the microprocessor, and other suitable components. In one form, the number of auxiliary controls 322 is selected based on the number of zones of the heater systems, and thus, should not be limited to two.

In one form, each auxiliary controller 322 includes a power controller 3401 and 3402 (collectively "power controllers 340") and a sensor controller 3421 and 3422 (collectively "sensor controllers 342"). In FIG. 3, different type of lines are used to distinguish between communication from the power controllers (solid lines) and from sensor controllers (dashed-dot-dashed lines). Each power controller 340 and each sensor controller 342 is coupled to the primary controller 324 for exchanging data. Each power controller 340 is coupled to a set of the zone control circuits 320 different from the other power controller 340. For example, in FIG. 3, the power controller 3401 is coupled to the zone control circuits 3201 to 3203, and more particularly to the power modules 3301 to 3303. The power controller 3402 is coupled to the zone control circuits 3204 to 3205, and more particularly to the power modules 3304 to 3306. The sensor controllers 342 are coupled to each other and to each of the zone control circuits 320, and more particularly, the sensor modules 332 of the zone control circuits 320. The sensor controllers 342 are also coupled to the power supply switch 326 for operating the switch 326 in the event of an abnormal performance detected by the sensor controllers 342.

In one form, the power controllers 340 receives an operation set-point for each heater zone 304 from the primary controller 324, and based on the operation set-point, the power controllers 340 outputs a power control signal to the respective power modules 330 for adjusting the power to the heater zones 340. In one form, the power control signal is a pulsed signal indicative of a duty cycle for actuating the control switch of the power converter. In addition to controlling power, the power controllers 340 receives signals from the input voltage detector, the output voltage detector, and/or the output current detector of the power modules 330, and determines the input voltage, the output voltage, and/or the output current. Such feedback information is transmitted to the primary controller 324 for further processing.

In one form, the sensor controllers 342 operate the zone control circuits 320 during a measurement operation to obtain electrical characteristics from each of the sensor modules 332. For example, during the measurement operation, the sensor controllers 342 operate the shunt of the sensor module 332 to divert leakage current and measure electrical characteristics of the heating element via, for example, the thermocouple junction. In another example, for a two-wire heater system, the sensor controllers 342 measures voltage and/or current of the heating element. In one form, each sensor controller 322 processes the electrical characteristics to determine performance characteristics of the heater zones 304, such as temperature at the thermo-couple junction or resistance and/or temperature of the heating element. For example, using looks-up tables and/or predefined algorithm, the sensor controllers 342 may perform a thermal couple conversion (mV to Temp.), cold-junction compensation, a resistance measurement, and/or a resistance to temperature measurement. The sensor controllers 342 may also be configured obtain signals from the sensor modules 320 that are indicative of the temperature of the circuit board and/or of the shunt.

The sensor controllers 322 also perform one or more diagnostics, such as heater zone diagnostics and/or system diagnostics, for detecting abnormal performance. For example, a heater zone diagnostic may include the sensor controllers 322 determining whether the heating elements are operating at a respective temperature set-point and/or a respective resistance set-point defined by the primary controller. If a given heating element exceeds their respective set-point, the sensor controller 322 determines an abnormal performance of the heating element and may perform a protective measure. The system diagnostics may include the sensor controllers 322 performing a zone-to-zone diagnostic in which the difference in temperature between adjacent heater zones of the heater system 302 is monitored and if the difference exceeds a temperature variance threshold, the sensor controllers 322 determine an abnormal performance of the thermal system and may issue a protective measure. Another example of a system diagnostic includes monitoring the temperature of various components, such as the shunt, connector, and/or the circuit board, to determine if the temperatures exceed a respective threshold. If so, the sensor controller 322 determines an abnormal performance of the component and performs a protective measure. The protection measure performed may include notifying the primary controller 324 of the abnormal performance, operating the power control switch 326, issuing an alert (audible and/or visual) to notify a technician, and/or other suitable measure.

In one form, each of the sensor controllers 342 perform a diagnostic verification check with respect to the measured electrical characteristics, the performance characteristics and/or diagnostics performed by the other sensor controller 342. For instance, the sensor controllers 342 determine whether the sensor modules 332 are providing accurate results by comparing the measured electrical characteristics provided to both controllers 342. In addition, the sensor controllers 342 verify the performance of the other sensor controller 342 by determining whether the calculated performance characteristics and/or diagnoses are the substantially the same. That is, if the sensor controller 3421 calculates a different temperature than the sensor controller 3422, both sensor controllers 342 are configured to detect the discrepancy, which can then be communicated to the primary controller 324. Accordingly, the sensor controllers 342 operate as a redundant diagnostic check to monitor the performance of the heater system 302 and of one another. While specific diagnostic examples are provided herein, the sensor controllers 342 may be configured other suitable diagnostics and/or system checks, and should not be limited to the ones described herein.

The primary controller 324 include electronics, such as one or more microprocessors, memory (e.g., RAM, ROM, etc.) that stores computer readable instructions (i.e., software programs) executed by the microprocessor, and other suitable components. In one form, the primary controller 324 controls the operation of the heater system 302 based on input from a user, feedback data, and/or prestored control programs.

In one form, the primary controller 324 receives inputs from the user by way of a computing device (not shown) communicably coupled to the control system 100. The user may define one or more operational settings, such as rate of change of temperature or power; temperature limits for the heater system or the control system; resistance limits of the heating elements; power output limits of the control system; and/or other suitable settings. The feedback data provided to the primary controller 324, from the auxiliary controllers 322, include the input voltage, the output voltage, the output current, the electrical characteristics of each heating element, the performance characteristics of the heater system, and/or diagnostic results.

The control programs are computer executable programs for controlling the heater system 302 within set conditions and each program is defined by one or more operation settings that are defined by the user or predetermined in the control program. For example, control programs may include: a power-up control in which power is gradually provided to the heater system until the voltage output/current output reaches a predefined limit; a steady-state control in which the temperature of the heater system is controlled to a specific set-point; and a set-rate control in which the temperature of the heater system is increased at a set ramp rate. The primary controller 324 may include other control programs based on the heater system it is controlling, and should not be limited to the examples provided herein.

In accordance with the control program being performed, the primary controller 324 determines operation set-points for the heater system 302, such as a temperature set-point, a power set-point, set rate control, and/or duration. For example, the primary controller 324 defines temperature set-points for each zone of the heater system 302 and/or for an overall average temperature of the heater system 302. In another example, the primary controller 324 determines power set-points (e.g., power level amount in voltage and/or current) for each zone 304 of the heater system 302. It should be readily understood that primary controller 324 may define other operation set-points, and should not be limited to the examples provided herein.

In one form, the primary controller 324 transmits the operation set-point to the auxiliary controllers 322 during a heating operation and acquires the feedback data from the auxiliary controller 322 during a measurement operation. For example, during the heating operation, the power controllers 340 receive the operation set-points and apply a power control signal to the power converters of the power modules 330 to output a desired power to the heater zones 304. The power controllers 324 also measure the amount of power in the control system (i.e., the input voltage, the output voltage, and/or output current), and provides this information to the primary controller 324. For the measurement operation, the primary controller 324 transmits a measurement instruction to the sensor controller 342 to measure the electrical characteristics of the heating elements. In one form, upon receiving this instruction, the sensor controller 342 actuates the shunts of the zone control circuits 320 and measures electrical characteristics of the heating elements. The sensor controller 342 may further calculate the performance characteristics and perform one or more diagnostics, as described above. The data obtained by the auxiliary controllers 322 is transmitted to the primary controller 324.

The primary controller 324 is also configured to perform one or more diagnostics to detect possible abnormal performance of the thermal system. The primary controller 324 may perform similar diagnostics as those performed by the auxiliary controllers, and some additional diagnostics, such as user temperature limit control for determining whether the temperature of the heater system exceeds a user defined temperature limit, and an auxiliary control check for verifying the results of the sensor controllers 342. For example, using the electrical characteristics of the heating elements, the primary controller 324 may calculate the performance characteristics using, for example, a thermal couple conversion (mV to Temp.), cold-junction compensation, and/or resistance-temperature conversion for two-wire system. The primary controller 324 compares its calculated values with that of the auxiliary controllers 322 to determine if the values are substantially the same. If not, the primary controller 324 performs a protective measure, such as notifying the user of the abnormal performance and/or discontinuing power to the control system 300 by operating the power supply switch 326.

The control system of the present disclosure is configured for a heater system having power-sense capability to reduce the number of wires for providing power and sensing performance characteristics of the heater system. The control system includes multiple sensor controllers that are configured to perform sensor diagnostic checks to authenticate measured/calculated values determined by one another. In addition, the primary controller is configured to perform a similar diagnostic check to provide another layer of authentication of the measured values from the auxiliary controllers. Accordingly, discrete sensors for verifying the performance characteristics of a heater system may not be needed, thus, reducing complexity of the system.

It should be readily understood, that while specific example diagrams are provided for the control system, the system may include additional components not detailed in the diagram. For example, the control system includes components, such as the primary controller and the auxiliary controllers, that operate at a lower voltage than, for example, the power converters of the zone control circuits. Accordingly, the control system includes a low power voltage supply (e.g., 3-5V) for powering low voltage components. In addition, to protect the low voltage components from high voltage, the control system includes electronic components that isolate the low voltage components from the high voltage components and still allow the components to exchange signal.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A control system for controlling a heater system having a plurality of resistive heating elements that define a plurality of heater zones, the control system comprising:
   a plurality of zone control circuits configured to provide power to the plurality of resistive heating elements and measure electrical characteristics of the plurality of resistive heating elements;
   a primary controller configured to provide an operation set-point for each of the plurality of heater zones based on the electrical characteristics;
   a plurality of power controllers configured to control the power provided to the plurality of heater zones based on the operation set-point; and
   a plurality of sensor controllers configured to monitor operation of the heater zones based on the electrical characteristics, wherein each of the plurality of sensor controllers is coupled to the primary controller and each of the plurality of zone control circuits.

2. The control system of claim 1, wherein each power controller from among the plurality of power controllers is coupled to the primary controller and a set of zone control circuits from among the plurality of zone control circuits.

3. The control system of claim 1, wherein the plurality of sensor controllers is configured to perform one or more diagnostics based on the electrical characteristics, and wherein the one or more diagnostics include a heater zone diagnostic, a zone-to-zone diagnostic, a diagnostic verification check, or a combination thereof.

4. The control system of claim 3, wherein the plurality of sensor controllers is configured to calculate a performance characteristic based on the electrical characteristics, and wherein the one or more diagnostics are further based on the performance characteristic.

5. The control system of claim 3, wherein:
   the plurality of sensor controllers is configured to perform a protective measure based on the one or more diagnostics,
   the protective measure includes at least one of:
      providing a notification to the primary controller, or
      selectively coupling a power supply to the primary controller, the plurality of zone control circuits, the plurality of power controllers, the plurality of sensor controllers, or a combination thereof.

6. The control system of claim 1, wherein the plurality of sensor controllers is configured to perform a heater zone diagnostic, and wherein the heater zone diagnostic includes:
   determining whether a set of resistive heating elements from among the plurality of resistive heating elements is operating in accordance with the operation set-point; and
   performing a protective measure in response to the set of resistive heating elements not operating in accordance with the operation set-point.

7. The control system of claim 1, wherein the plurality of sensor controllers is configured to perform a zone-to-zone diagnostic, and wherein the zone-to-zone diagnostic includes:
   determining a temperature difference between a pair of adjacent heater zones from among the plurality of heater zones; and
   performing a protective measure in response to the temperature difference exceeding a temperature variance threshold.

8. The control system of claim 1, wherein the plurality of sensor controllers is configured to perform a diagnostic verification check, and wherein the diagnostic verification check includes authenticating the electrical characteristics measured by each of the plurality of sensor controllers.

9. The control system of claim 1, wherein the operation set-point includes a temperature set-point, a power set-point, or a combination thereof.

10. The control system of claim 1, wherein the primary controller is configured to perform a temperature limit control diagnostic, and wherein the temperature limit control diagnostic includes:

determining whether a temperature of a set of resistive heating elements from among the plurality of resistive heating elements exceeds a predefined temperature limit; and performing a protective measure in response to the temperature exceeding the predefined temperature limit.

11. The control system of claim 1, wherein the primary controller is configured to perform an auxiliary control check diagnostic, and wherein the auxiliary control check diagnostic includes:

determining a primary performance characteristic based on the electrical characteristics;

obtaining a plurality of performance characteristics determined by the plurality of sensor controllers; and selectively performing a protective measure based on a comparison between the primary performance characteristic and the plurality of performance characteristics.

12. A method for controlling a heater system having a plurality of resistive heating elements that define a plurality of heater zones, the method comprising:

providing, by a plurality of zone control circuits, power to the plurality of resistive heating elements;

measuring, by the plurality of zone control circuits, electrical characteristics of the plurality of resistive heating elements;

providing, by a primary controller, an operation set-point for each of the plurality of heater zones based on the electrical characteristics;

controlling, by a plurality of power controllers, the power provided to the plurality of heater zones based on the operation set-point; and monitoring, by a plurality of sensor controllers, operation of the heater zones based on the electrical characteristics, wherein each of the plurality of sensor controllers is coupled to the primary controller and each of the plurality of zone control circuits.

13. The method of claim 12, further comprising performing, by the plurality of sensor controllers, one or more diagnostics based on the electrical characteristics, wherein the one or more diagnostics include a heater zone diagnostic, a zone-to-zone diagnostic, a diagnostic verification check, or a combination thereof.

14. The method of claim 13, further comprising calculating, by the plurality of sensor controllers, a performance characteristic based on the electrical characteristics, wherein the one or more diagnostics are further based on the performance characteristic.

15. The method of claim 13, wherein the heater zone diagnostic includes:

determining whether a set of resistive heating elements from among the plurality of resistive heating elements is operating in accordance with the operation set-point; and performing a protective measure in response to the set of resistive heating elements not operating in accordance with the operation set-point.

16. The method of claim 13, wherein the zone-to-zone diagnostic includes:

determining a temperature difference between a pair of adjacent heater zones from among the plurality of heater zones; and performing a protective measure in response to the temperature difference exceeding a temperature variance threshold.

17. The method of claim 13, wherein the diagnostic verification check includes authenticating the electrical characteristics measured by each of the plurality of sensor controllers.

18. The method of claim 12, further comprising performing, by the primary controller, a temperature limit control diagnostic, wherein the temperature limit control diagnostic includes:

determining whether a temperature of a set of resistive heating elements from among the plurality of resistive heating elements exceeds a predefined temperature limit; and performing a protective measure in response to the temperature exceeding the predefined temperature limit.

19. The method of claim 12, further comprising performing, by the primary controller, an auxiliary control check diagnostic, wherein the auxiliary control check diagnostic includes:

determining a primary performance characteristic based on the electrical characteristics;

obtaining a plurality of performance characteristics determined by the plurality of sensor controllers; and selectively performing a protective measure based on a comparison between the primary performance characteristic and the plurality of performance characteristics.

20. A control system for controlling a heater system having a plurality of resistive heating elements that define a plurality of heater zones, the control system comprising:

a plurality of zone control circuits configured to provide power to the plurality of resistive heating elements and measure electrical characteristics of the plurality of resistive heating elements;

a primary controller configured to provide an operation set-point for each of the plurality of heater zones based on the electrical characteristics;

a plurality of power controllers configured to control the power provided to the plurality of heater zones based on the operation set-point; and a plurality of sensor controllers configured to monitor operation of the heater zones based on the electrical characteristics, wherein each of the plurality of sensor controllers is coupled to the primary controller and each of the plurality of zone control circuits, and wherein:

each power controller from among the plurality of power controllers is coupled to the primary controller and a set of zone control circuits from among the plurality of zone control circuits; and the plurality of sensor controllers is configured to perform one or more diagnostics based on the electrical characteristics.

*    *    *    *    *